(12) United States Patent
Mashimo et al.

(10) Patent No.: US 8,920,887 B2
(45) Date of Patent: Dec. 30, 2014

(54) METHOD OF BONDING CONDUCTIVE MATERIAL TO STAINLESS STEEL, AND HDD MAGNETIC HEAD SUSPENSION

(75) Inventors: Kenji Mashimo, Kyoto (JP); Syuuichi Kashimoto, Kyoto (JP)

(73) Assignee: Suncall Corporation, Kyoto (JP)

( * ) Notice: Subject to any disclaimer, the term of this patent is extended or adjusted under 35 U.S.C. 154(b) by 130 days.

(21) Appl. No.: 13/339,911

(22) Filed: Dec. 29, 2011

(65) Prior Publication Data

US 2012/0196152 A1    Aug. 2, 2012

(30) Foreign Application Priority Data

Jan. 28, 2011    (JP) ................... 2011-016476

(51) Int. Cl.

| | |
|---|---|
| B05D 5/12 | (2006.01) |
| B05D 3/06 | (2006.01) |
| B23K 26/34 | (2014.01) |
| B23K 26/364 | (2014.01) |
| B23K 26/22 | (2006.01) |
| B23K 26/322 | (2014.01) |
| B23K 1/005 | (2006.01) |
| G11B 5/48 | (2006.01) |
| C23C 22/72 | (2006.01) |
| C22B 9/22 | (2006.01) |
| C23C 18/14 | (2006.01) |
| C23C 18/16 | (2006.01) |

(52) U.S. Cl.
CPC ............... *G11B 5/482* (2013.01); *C23C 22/72* (2013.01); *C22B 9/223* (2013.01); *C23C 18/14* (2013.01); *C23C 18/1612* (2013.01); *G11B 5/486* (2013.01); *B23K 26/22* (2013.01); *B23K 2201/38* (2013.01)

USPC ........... 427/556; 427/555; 427/100; 427/123; 219/121.64; 219/121.69; 219/121.85

(58) Field of Classification Search
None
See application file for complete search history.

(56) References Cited

U.S. PATENT DOCUMENTS

| | | | | |
|---|---|---|---|---|
| 3,562,009 | A | * | 2/1971 | Cranston et al. ............... 427/597 |
| 4,637,862 | A | * | 1/1987 | Eesley et al. .................. 205/109 |

(Continued)

FOREIGN PATENT DOCUMENTS

| | | |
|---|---|---|
| JP | 36-2314 | 3/1961 |
| JP | 61-001229 | 1/1986 |

(Continued)

OTHER PUBLICATIONS

Japanese Office Action issued May 17, 2013 in corresponding Japanese Patent Application No. 2011-016476 with partial English machine-translation.

(Continued)

*Primary Examiner* — Marianne L Padgett
(74) *Attorney, Agent, or Firm* — Wenderoth, Lind & Ponack, L.L.P.

(57) ABSTRACT

A method of bonding a conductive material to stainless steel includes: a first step of applying a conductive paste to a surface of a base plate made of the stainless steel; and a second step of removing, in an area located within the surface of the base plate and covered with the conductive paste, a part of a passivation film on a surface of the stainless steel without allowing a base material of the stainless steel of the base plate to come into contact with air. The removing of the passivation film is achieved, for example, by irradiation of laser light.

1 Claim, 6 Drawing Sheets

(56) References Cited

U.S. PATENT DOCUMENTS

| | | | |
|---|---|---|---|
| 4,750,947 A * | 6/1988 | Yoshiwara et al. | 148/512 |
| 5,233,152 A * | 8/1993 | Prokosch et al. | 219/121.63 |
| 5,314,003 A * | 5/1994 | Mackay | 164/494 |
| 5,736,709 A * | 4/1998 | Neiheisel | 219/121.61 |
| 5,821,494 A * | 10/1998 | Albrecht et al. | 219/121.64 |
| 5,883,437 A * | 3/1999 | Maruyama et al. | 257/773 |
| 6,154,952 A * | 12/2000 | Tangren | 29/603.04 |
| 6,350,326 B1 * | 2/2002 | McCay et al. | 148/503 |
| 6,844,522 B1 * | 1/2005 | Wang et al. | 219/121.64 |
| 6,870,708 B1 * | 3/2005 | Fossum et al. | 360/244.5 |
| 7,414,814 B1 * | 8/2008 | Pan | 360/264.2 |
| 8,149,545 B1 * | 4/2012 | Chai et al. | 360/294.3 |
| 8,203,807 B2 * | 6/2012 | Takasugi et al. | 360/265.9 |
| 8,317,081 B2 * | 11/2012 | Ogaki et al. | 228/262.42 |
| 8,492,675 B2 * | 7/2013 | Wakisaka et al. | 219/121.64 |
| 8,553,364 B1 * | 10/2013 | Schreiber et al. | 360/245.9 |
| 2001/0043443 A1 | 11/2001 | Okamoto et al. | |
| 2004/0075946 A1 | 4/2004 | Motonishi et al. | |
| 2006/0193087 A1 * | 8/2006 | Yao et al. | 360/294.4 |
| 2008/0192383 A1 * | 8/2008 | Takasugi et al. | 360/244.2 |
| 2010/0271735 A1 * | 10/2010 | Schreiber | 360/290 |
| 2011/0020666 A1 * | 1/2011 | Wakisaka et al. | 428/650 |
| 2011/0051290 A1 * | 3/2011 | Inoue et al. | 360/244.2 |
| 2011/0109996 A1 * | 5/2011 | Nakamura et al. | 360/234.5 |
| 2012/0183702 A1 * | 7/2012 | Pique et al. | 427/554 |
| 2013/0168370 A1 * | 7/2013 | Kavosh | 219/121.62 |
| 2013/0335484 A1 * | 12/2013 | Gerner et al. | 347/68 |
| 2014/0212682 A1 * | 7/2014 | Lee et al. | 428/600 |

FOREIGN PATENT DOCUMENTS

| | | | |
|---|---|---|---|
| JP | 62-37377 A * | 2/1987 | 427/581 |
| JP | 63-145794 | 6/1988 | |
| JP | 6-246475 A * | 9/1994 | 219/121.64 |
| JP | 2002-042547 | 2/2002 | |
| JP | 2002-50140 | 2/2002 | |
| JP | 2004-139687 | 5/2004 | |
| JP | 2005-111531 A * | 4/2005 | B23K 1/005 |
| JP | 2005-296960 | 10/2005 | |

OTHER PUBLICATIONS

Japanese Notification of Reasons for Refusal issued Mar. 6, 2013 in corresponding Japanese Patent Application No. 2011-016476 with English translation.

* cited by examiner

METHOD OF BONDING CONDUCTIVE MATERIAL TO STAINLESS STEEL, AND HDD MAGNETIC HEAD SUSPENSION

TECHNICAL FIELD

The present invention relates to a method of bonding a conductive material to stainless steel, and to an HDD magnetic head suspension in which a metal component, made of stainless steel, and piezoelectric elements are conductively connected to each other via a conductive material.

BACKGROUND ART

A magnetic head suspension to be used in a hard disk drive (HDD) includes a base plate to be mounted to a support shaft, such as a carriage arm, and a load beam extending from the base plate toward a leading end. The support shaft is driven by an actuator using a voice coil motor (VCM), thereby performing, in a seeking direction (see S direction of FIG. 1), positioning control of a magnetic head mounted on the leading end side of the load beam via a flexure. In high recording density HDDs of recent years, it is difficult to perform positioning control of the magnetic head with a high degree of accuracy using only the actuator for driving the support shaft. Accordingly, dual stage actuators have been adopted in which piezoelectric elements functioning as a micromotion actuator are further provided between the base plate and the load beam, and the load beam is oscillated in the seeking direction by the piezoelectric elements.

In such a dual stage actuator-type magnetic head suspension, a metal component (for example, the base plate) constituting the suspension and the piezoelectric elements need to be conductively connected to each other. For example, in a suspension illustrated in FIG. 11 of Patent Literature 1, a metal component (base plate 60) and piezoelectric elements (actuator elements 30) are connected to each other with a silver paste 78a.

CITATION LIST

Patent Literature 1: JP 2002-50140 A
Patent Literature 2: JP 63-145794 A
Patent Literature 3: JP 2002-42547 A

SUMMARY OF INVENTION

Technical Problem

Because the piezoelectric elements mounted on the magnetic head suspension are generally driven at a low current (500 mA or less), it is necessary to bond the metal component and a conductive material (for example, a conductive paste or solder) in a good conductive state in the low current range. Specifically, resistance of a bond portion between the metal component and the conductive material in the low current range needs to be constant regardless of the direction of electrical current and the amount of voltage (that is, needs to show the ohmic characteristics).

On the other hand, because the base plate and the load beam, which are metal components constituting the magnetic head suspension, are required to be as thin as possible for lighter weight and have high strength, it is often the case that stainless steel excellent in those properties is used for the metal components. However, the surface of stainless steel is covered with a passivation film formed when chromium (Cr), which is included in the stainless steel, is combined with oxygen in the air. Because the passivation film inhibits conductivity between a metal component made of stainless steel and a conductive material fixed to the surface of the metal component, it is difficult to form ohmic bonding in the low current range.

Ohmic bonding may be formed, for example, by removing the passivation film on the surface of the stainless steel and fixing the conductive material to the removed surface. However, even if the passivation film is removed due to a scratch or the like, the passivation film restores in about a few seconds due to bonding with oxygen in the air. Therefore, it is very difficult to adopt the above-mentioned method.

Patent Literature 2, for example, describes a technology of increasing the conductivity between the stainless steel and the conductive material by plating the stainless steel with nickel (Ni) or the like. However, the plating results in increases in the number of production processes and material costs. In particular, in HDD magnetic head suspensions, it is sometimes the case that gold plating is applied to the stainless steel in order to ensure the conductivity, however, the material costs substantially increase with the use of gold.

In addition, Patent Literature 3 describes a technology of increasing the conductivity between the stainless steel and the conductive material by reforming the surface layer of the stainless steel. However, as with the method of Patent Literature 2, the technology of Patent Literature 3 leads to increases in the number of production processes and material costs, and also does not always ensure the condition in which the resistance of the bond portion between the stainless steel and the conductive material shows the ohmic characteristics in a stable manner.

The problem that needs to be solved in the present invention is to stably obtain, in the low current range, a good conductive state of the bond portion between the stainless steel and the conductive material, which is bonded to the surface of the stainless steel, by a low cost method.

Solution to Problem

In order to solve the above-mentioned problem, the present invention provides a method of bonding a conductive material to a surface of stainless steel in an air atmosphere, the method including: a first step of applying the conductive material in a paste form (conductive paste) or the conductive material in a liquid form (for example, molten metal such as solder) to the surface of the stainless steel; and a second step of removing, in an area located within the surface of the stainless steel and covered with the conductive material, a part of a passivation film on the surface of the stainless steel without allowing a base material of the stainless steel to come into contact with air.

Thus, by removing the part of the passivation film on the surface of the stainless steel covered with the conductive material, it is possible to bring the conductive material and the stainless steel into contact with each other without the passivation film interposed therebetween. As a result, the conductive material and the stainless steel are bonded in a good conductive state. At this point, the part of the passivation film on the surface of the stainless steel is removed without allowing the base material of the stainless steel to come into contact with the air. With this, it is possible to prevent the passivation film from being restored due to the contact of the stainless steel base material with the air and obtain a good bonding state between the stainless steel and the conductive material in a reliable manner. In particular, austenitic stainless steel is susceptible to the formation of the passivation film, and it is therefore effective to bond the austenitic stainless steel and the conductive material by the above-mentioned method.

The above-mentioned second step is carried out by, for example, irradiating a part of the conductive material applied to the surface of the stainless steel with laser light so as to, at the same time of the removing of the part of the passivation film on the surface of the stainless steel, cover a part of the surface of the stainless steel, from which the passivation film has been removed, with a covering portion formed by melting the part of the conductive material by the irradiation of the laser light. That is, by irradiating the conductive material with the laser light, an irradiated part of the conductive material melts instantly and the laser light penetrates through the irradiated part of the conductive material, and then the laser light is applied onto a part of the surface of the stainless steel to remove a part of the passivation film. At the same time, the part of the surface of the stainless steel from which the passivation film has been removed is covered with the covering portion made of the conductive material melted by the laser light. Thus, through irradiation of the laser light, the removal of the passivation film and the covering with the covering portion made of the molten conductive material are achieved at the same time. Accordingly, the part of the stainless steel base material from which the passivation film has been removed by the laser light does not come into contact with the air, and therefore, the restoration of the passivation film is prevented. As a result, it is possible to stably bond the stainless steel and the conductive material in a good conductive state.

As described above, when the conductive material applied to the surface of the stainless steel is irradiated with the laser light, a part of the conductive material surrounding the laser light is blown off by the heat of the laser light. As a result, it is sometimes the case that a part of the conductive material (covering portion) covering the part from which the passivation film has been removed and the remaining part of the conductive material which has not been blown off by the laser light are separated from each other. In this condition, the covering portion is provided in contact with the stainless steel base material without the passivation film interposed therebetween, and therefore, the covering portion and the stainless steel base material are bonded in a good conductive state. However, the remaining part of the conductive material which has not been blown off by the laser light is bonded to the surface of the stainless steel via the passivation film. Accordingly, by providing a third step of bonding those parts of the conductive material with a new conductive material, it is possible to bond the remaining part of the conductive material which has not been blown off by the laser light to the stainless steel base material in a good conductive state via the covering portion and the new conductive material.

In addition, the above-mentioned second step may include sticking a jig to the conductive material applied to the surface of the stainless steel and removing a part of the passivation film on the surface of the stainless steel using a tip of the jig. In this case, at the same time of removing the part of the passivation film with the tip of the jig, the conductive material in the form of a paste or a liquid enters the part from which the passivation film has been removed. As a result, it is possible to bring the stainless steel base material and the conductive material into contact with each other without the passivation film interposed therebetween while not allowing the stainless steel base material to come into contact with the air.

When the method described above is employed, it is possible to obtain an HDD magnetic head suspension, including: a metal component made of stainless steel; a piezoelectric element mounted on the metal component; and a conductive material bonded to a surface of the metal component and a surface of the piezoelectric element so as to conductively connect the metal component and the piezoelectric element, in which the surface of the metal component in an area covered with the conductive material has a part in which a passivation film is removed so that a base material of the stainless steel of the metal component is provided in contact with the conductive material. In the magnetic head suspension, the resistance of the bond portion between the metal component made of stainless steel and the conductive material shows the ohmic characteristics in the low current range. As a result, it is possible to supply current to the piezoelectric element in a stable manner.

Advantageous Effects of Invention

As described above, according to the present invention, a part of the passivation film on the surface of the stainless steel is removed without allowing the stainless steel base material to come into contact with the air. With this, it is possible to bond the stainless steel and the conductive material in a good conductive state.

DESCRIPTION OF EMBODIMENTS

Hereinbelow, embodiments of the present invention are described with reference to the drawings.

Figure 1:
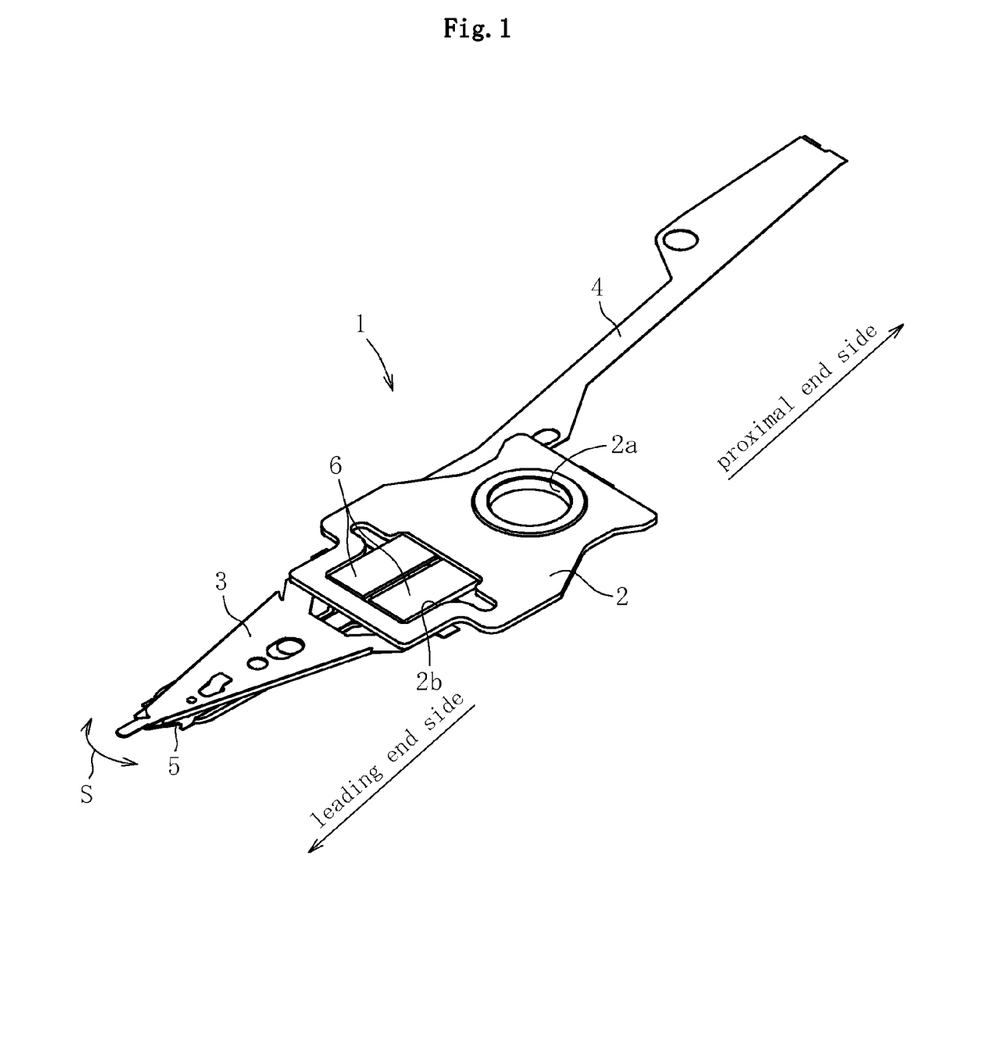
FIG. 1 A perspective view of an HDD magnetic head suspension according to an embodiment of the present invention.

An HDD magnetic head suspension 1 illustrated in FIG. 1 includes a base plate 2, a load beam 3, a flexure 4, a head 5, and piezoelectric elements 6. Note that, in a longitudinal direction of the HDD magnetic head suspension 1, a side on which the head 5 is mounted is referred to as "leading end side" and the opposite side is referred to as "proximal end side" in the following description. In addition, the surface seen in FIG. 1 is referred to as "upper surface" and the opposite surface is referred to as "lower surface". However, those expressions are used for convenience of description, and there is no intention to limit the use of the HDD magnetic head suspension 1.

The base plate 2 is a metal component made of stainless steel (for example, austenitic stainless steel), and a shaft hole 2a for mounting a support shaft (not shown), such as a carriage arm, is formed on the proximal end side and a hole 2b for fitting the piezoelectric elements 6 thereto is formed on the leading end side. To a leading end portion of the base plate 2, the load beam 3 made of stainless steel is fixed by appropriate means, such as welding and adhesion. Onto the lower surfaces of the base plate 2 and the load beam 3, the flexure 4 is fixed by appropriate means, and the head 5 is fixed to the tip of the flexure 4.

The piezoelectric elements 6 are fitted and fixed to the hole 2b of the base plate 2. In the illustrated example of FIG. 1, a pair of long plate-like piezoelectric elements 6 are disposed side by side. By energizing the pair of piezoelectric elements 6 to cause one of the piezoelectric elements 6 to expand and the other to contract, the tip of the load beam 3 oscillates in the seeking direction (see the S direction of FIG. 1).

Figure 2:
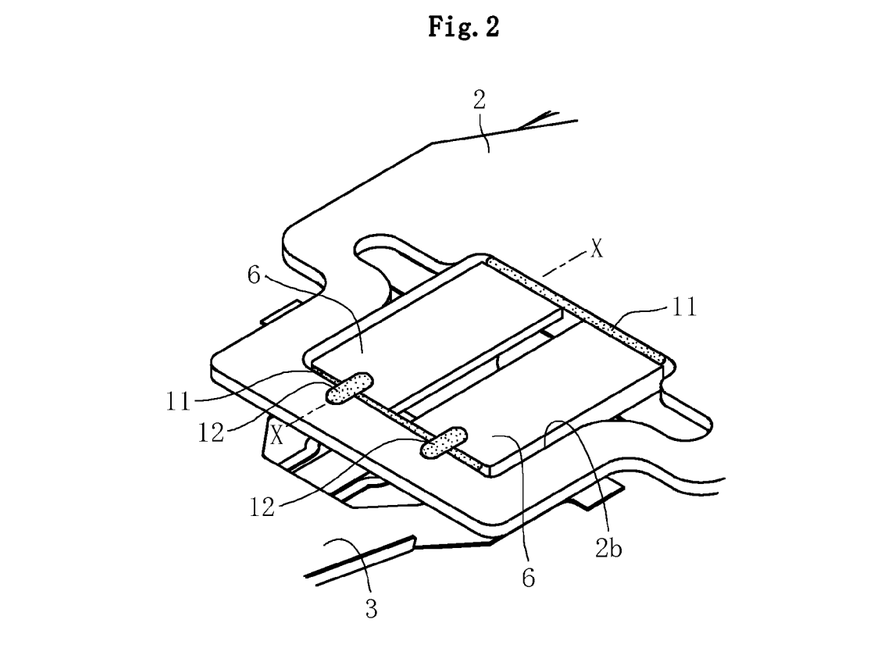
FIG. 2 An enlarged view of the HDD magnetic head suspension of FIG. 1.
Figure 3:
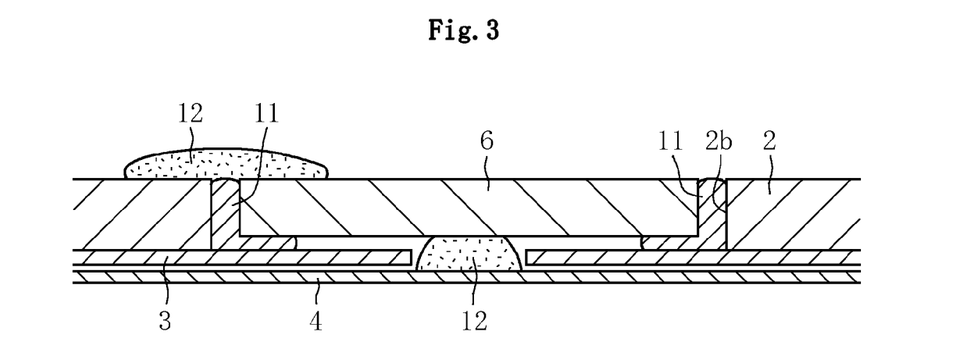
FIG. 3 A sectional view taken along the line X-X of FIG. 2.

As illustrated in an enlarged view of FIG. 2, the piezoelectric elements 6 are fixed to the base plate 2 and the load beam 3 by an insulating adhesive 11. Specifically, as illustrated in FIG. 3, leading and proximal end portions of the piezoelectric elements 6 are fixed to the hole 2b of the base plate 2 and the upper surface of the load beam 3 by the insulating adhesive 11. An epoxy adhesive, for example, can be used as the insulating adhesive 11.

The piezoelectric elements 6, the base plate 2, and the flexure 4 are conductively connected to each other via a conductive material. As the conductive material, a conductive paste 12, for example, is used. The conductive paste 12 is a paste made by mixing a conductive member into a resin. Metal powder, particularly silver powder or copper powder, for example, may be used as the conductive member. A hardening resin, specifically an epoxy adhesive, may be used as the resin, for example. In this embodiment, as illustrated in FIG. 3, the lower surface of each of the piezoelectric elements 6 and the upper surface of the flexure 4 are conductively bonded to each other by the conductive paste 12, and a leading end portion of the upper surface of each of the piezoelectric elements 6 and the upper surface of the base plate 2 are conductively bonded to each other by the conductive paste 12.

At the time when the conductive paste 12 is bonded, within the HDD magnetic head suspension 1 having the above-mentioned structure, to the upper surface of the base plate 2 as a metal component made of stainless steel, a bonding method according to an embodiment of the present invention is applied. Hereinbelow, the procedure of the bonding method is specifically described. Note that, the method of bonding the conductive paste 12 to the stainless steel (base plate 2) described hereinbelow is carried out in an air atmosphere at ordinary temperatures and pressures all the way to completion.

Figure 4:
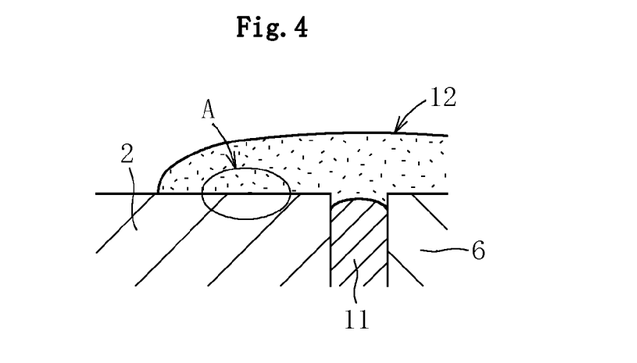
FIG. 4 A sectional view illustrating a first step of a bonding method of a conductive material to stainless steel according to the embodiment of the present invention.
Figure 5:
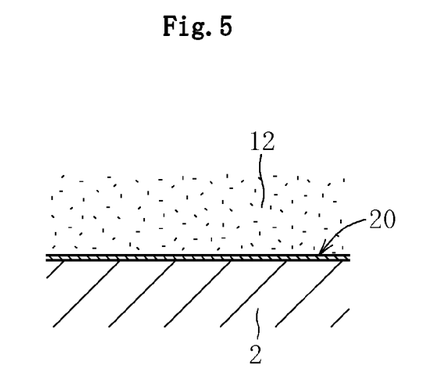
FIG. 5 An enlarged view of the part A in FIG. 4.

First, the piezoelectric elements 6 are fitted and fixed to the hole 2b of the base plate 2 by the insulating adhesive 11, and subsequently, as illustrated in FIG. 4, the conductive paste 12 is applied to be laid across the upper surfaces of the base plate 2 and the piezoelectric elements 6 (first step). At this time, as illustrated in FIG. 5, a passivation film 20 is formed on the surface of the base plate 2 made of stainless steel. Accordingly, the conductive paste 12 is disposed on the passivation film 20 and is not provided in direct contact with the stainless steel base material.

Figure 6:
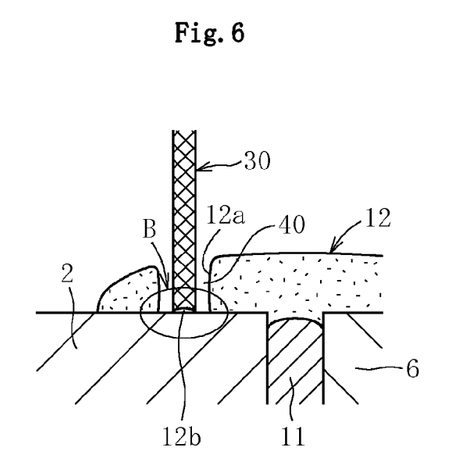
FIG. 6 A sectional view illustrating a second step of the above-mentioned bonding method.

Next, as illustrated in FIG. 6, the conductive paste 12 applied to the upper surface of the base plate 2 is irradiated with laser light 30 (second step). The irradiation of the laser light 30 may be performed before or after solidification of the conductive paste 12. The laser light 30 penetrates into the conductive paste 12 to form a through-hole 12a, and also melts, within the surface of the base plate 2, a part of the area covered with the conductive paste 12, to thereby remove the passivation film 20 from the part. At the same time, the part of the surface of the stainless steel base material from which the passivation film 20 has been removed is covered with metal (for example, silver or copper) which is a conductive member included in the conductive paste 12 melted by the laser light 30. The metal solidifies to form a covering portion 12b (see FIG. 7). Through irradiation of the laser light 30, as described above, the removal of the passivation film 20 and the formation of the covering portion 12b are achieved at the same time. Accordingly, the part of the stainless steel base material from which the passivation film 20 has been removed does not substantially come into contact with the air, and therefore, the restoration of the passivation film 20 is prevented. In this manner, because the covering portion 12b and the stainless steel base material of the base plate 2 are brought into direct contact with each other without the passivation film 20 interposed therebetween, the covering portion 12b and the stainless steel base material of the base plate 2 are bonded in a good conductive state.

Figure 7:
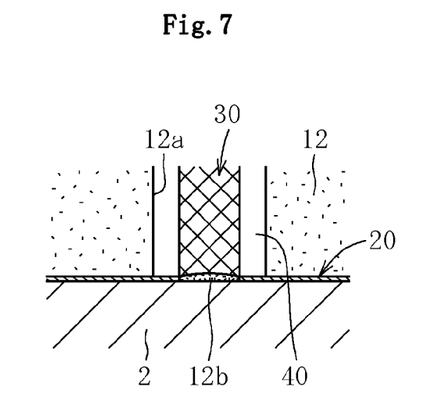
FIG. 7 An enlarged view of the part B in FIG. 6.
Figure 8:
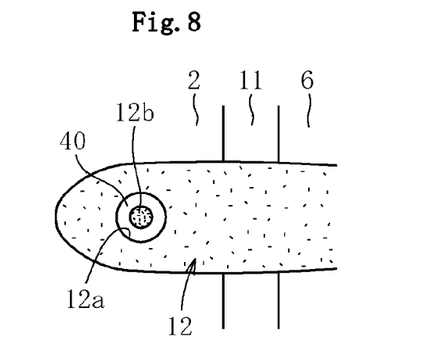
FIG. 8 A plan view of FIG. 6.

At this point, a surrounding area of the part of the conductive paste 12 irradiated with the laser light 30 is blown off by the energy of the laser light 30, to thereby create a space 40 around a region through which the laser light 30 has passed (see FIGS. 6 to 8). Therefore, the conductive paste 12 applied earlier and the covering portion 12b formed immediately below the laser light 30 are disposed on the surface of the base plate 2 with a space therebetween. In this condition, although the covering portion 12b and the stainless steel base material of the base plate 2 are bonded in a good conductive state without the passivation film 20 interposed therebetween, the conductive paste 12 applied earlier is not in a good conductive state because of being disposed on the passivation film 20.

Figure 9:
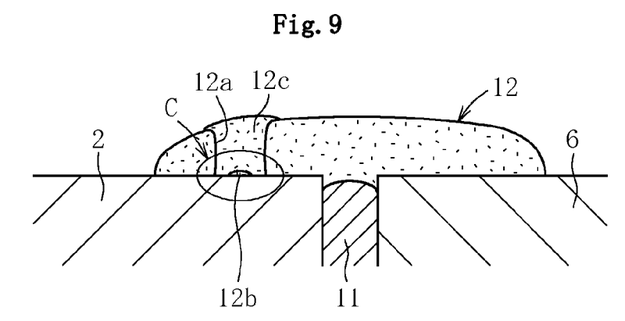
FIG. 9 A sectional view illustrating a third step of the above-mentioned bonding method.
Figure 10:
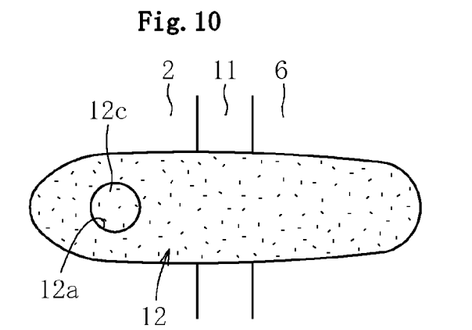
FIG. 10 A plan view of FIG. 9.
Figure 11:
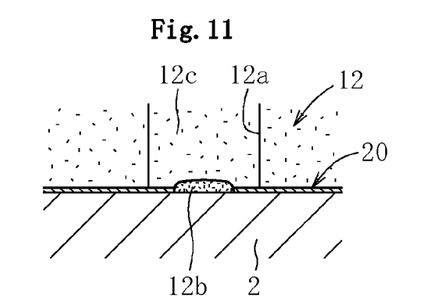
FIG. 11 An enlarged view of the part C in FIG. 9.

In view of the above, as illustrated in FIGS. 9 and 10, the through-hole 12a formed in the conductive paste 12 by the laser light 30 is filled with a new conductive paste 12c (third step). With this, the covering portion 12b, which is bonded to the stainless steel base material of the base plate 2 in a good conductive state, is conductively connected via the new conductive paste 12c to the conductive paste 12 applied earlier (see FIG. 11). With this, via the covering portion 12b and the new conductive paste 12c, the base material of the base plate 2 and the conductive paste 12 are connected without the passivation film 20 interposed therebetween. As a result, a good conductive state is achieved, even in the low current region, between the base plate 2 and the conductive paste 12, further between the base plate 2 and the piezoelectric elements 6. Then, by solidifying the conductive pastes 12 and 12c, the bonding of the conductive paste 12 to the base plate 2 is completed. Note that, the new conductive paste 12c used in the third step may be made of the same material as the material of the conductive paste 12 applied earlier, or may be made of a different material.

The present invention is not limited to the embodiment described above. Other embodiments of the present invention are described below. In the following description, components having the same functions as those of the embodiment described above are denoted by the same reference symbols and overlapping description of the components is omitted.

Figure 12:
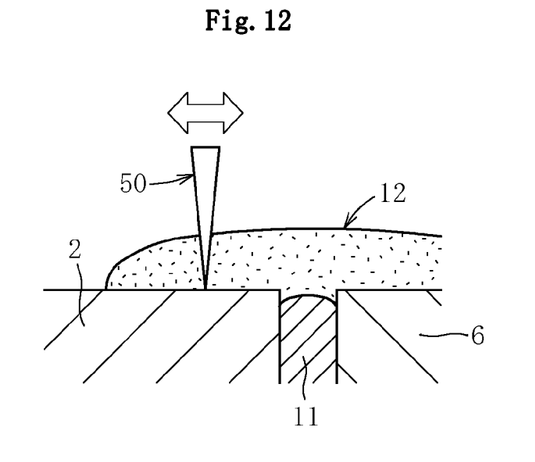
FIG. 12 A sectional view illustrating a second step of a bonding method according to another embodiment of the present invention.
Figure 13:
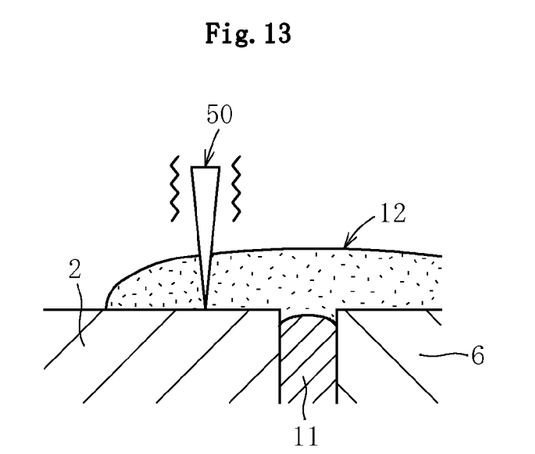
FIG. 13 A sectional view illustrating the second step of the bonding method according to the another embodiment of the present invention.

In the above-mentioned embodiment, the bonding of the conductive paste 12 to the base plate 2 made of stainless steel is achieved by the laser light 30, however, the present invention is not limited thereto. For example, after the conductive paste 12 is applied to the surface of the base plate 2 as illustrated in FIG. 4, a jig 50 may be stuck to the conductive paste 12 before being solidified as illustrated in FIG. 12, to thereby remove a part of the passivation film 20 on the surface of the base plate 2 using the tip of the jig 50. As the jig 50, a pin having a sharp tip, for example, is used. The jig 50 is moved in a horizontal direction in FIG. 12 while being stuck to the conductive paste 12 to be thrust against the surface of the base plate 2. In this manner, the surface of the base plate 2 is scratched with the tip of the jig 50, to thereby remove a part of the passivation film 20. Alternatively, as illustrated in FIG. 13, ultrasonic vibration may be applied to the jig 50 while the jig 50 is stuck to the conductive paste 12 to be thrust against the surface of the base plate 2, to thereby remove a part of the passivation film 20.

Figure 14:
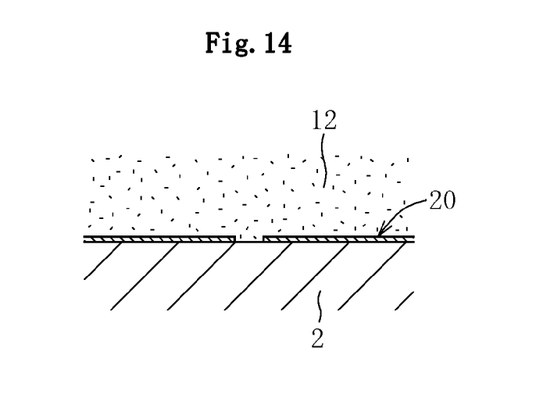
FIG. 14 A sectional view of a periphery of a passivation film removed part formed by the bonding method of FIG. 12 or FIG. 13.

At this point, because the conductive paste 12 before being solidified is in close contact with the entire circumference of the jig 50, the stainless steel base material does not come into contact with the air during the time that a part of the passivation film 20 on the surface of the base plate 2 is being removed with the tip of the jig 50. The conductive paste 12 before being solidified enters the part from which the passivation film 20 has been removed, with the result that the conductive paste 12 and the stainless steel base material come into direct contact with each other as illustrated in FIG. 14. Subsequently, the jig 50 is pulled out from the conductive paste 12, and the conductive paste 12 solidifies to complete the bonding.

In addition, the above-mentioned embodiment describes a case in which the conductive paste is used as a conductive material bonded to the surface of the base plate 2 made of stainless steel. However, the present invention is not limited thereto, and a metallic material (such as solder), for example, may be used. In this case, the metallic material being melted into a liquid state is applied to the surface of the stainless steel (see FIG. 4), and a part of the passivation film 20 on the surface of the base plate 2 is removed in the same way as described above. Subsequently, the molten metal solidifies to complete the bonding.

In addition, the above-mentioned embodiment describes a case in which the conductive material is bonded to the base plate 2 made of stainless steel. However, the present invention is not limited thereto, and the bonding method of the present invention may be applied to the bonding of the conductive material to the surface of another metal component made of stainless steel.

Example 1

In order to confirm the effect of the bonding method of the present invention, the following test was carried out. First, prepared were a test piece A in which a conductive material (here, a conductive paste formed by mixing silver powder with an epoxy adhesive) was simply fixed to the surface of stainless steel, and a test piece B formed by applying the bonding method (here, the bonding method using laser light described in FIGS. 4 to 11) of the present invention to the test piece A. The conductive state of those test pieces was compared. Specifically, an electric voltage was applied by an external power supply to the bond portion between the conductive paste and the stainless steel in the test pieces A and B, and the relationship between voltage and current at the bond portion as the voltage value was gradually increased was examined.

Figure 15:
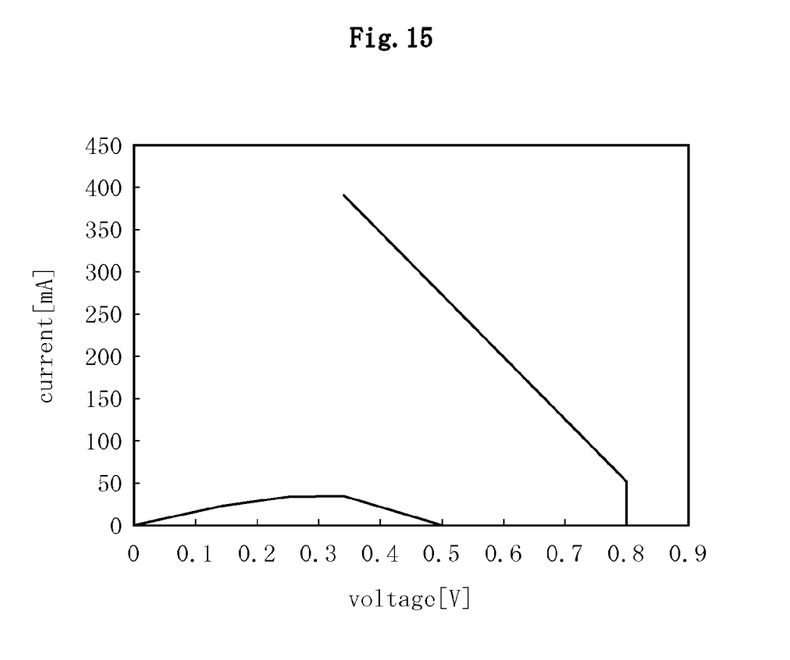
FIG. 15 A graph illustrating a result of a conductivity test on a test piece A (comparative specimen).

With reference to the result of the test piece A in FIG. 15, when the voltage (horizontal axis) applied to the bond portion is small, current (vertical axis) rarely flows through the bond portion because the resistance of the bond portion is very large. Then, when the voltage at the bond portion reaches a predetermined value (about 0.8 V), the resistance of the bond portion drastically falls, and with this, the current drastically increases. Thus, in the test piece A formed by simply fixing the conductive paste to the surface of the stainless steel, the resistance of the bond portion becomes unstable in the low current range.

Figure 16:
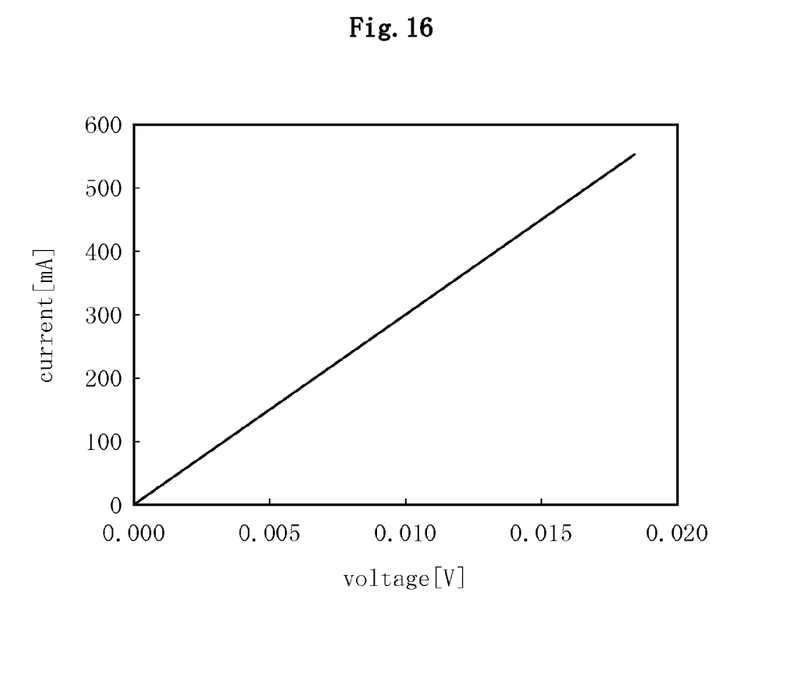
FIG. 16 A graph illustrating a result of a conductivity test on a test piece B (actual implementation).

On the other hand, with reference to the result of the test piece B in FIG. 16, the voltage applied to the bond portion and the current have a proportionate relationship also in a low current range of 500 mA and less, and thus, it is found that the resistance of the bond portion is constant. From the result, it was confirmed that, with the bonding method of the present invention, the bond portion between the stainless steel and the conductive material showed the ohmic characteristics even in the low current range.

REFERENCE SIGNS LIST

1 HDD magnetic head suspension
2 base plate (metal component made of stainless steel)
3 load beam
4 flexure
5 head
6 piezoelectric element
11 insulating adhesive
12 conductive paste (conductive material)
12a through-hole
12b covering portion
12c new conductive paste
20 passivation film
30 laser light
40 space
50 jig

The invention claimed is:
1. A method of electrically connecting a stainless steel component and a piezoelectric element of a hard disk drive (HDD) magnetic head suspension, said method comprising:
applying an electrically conductive material in a form of one of a conductive paste and a liquefied metallic material, so as to lay across a surface of the stainless steel component and a surface of the piezoelectric element;
irradiating a part of the conductive material applied to the surface of the stainless steel component with laser light in an air atmosphere, so as to remove a passivation film on a part of the surface of the stainless steel component and define a covering portion that is the portion of the conductive material which covers the part of the surface of the stainless steel component from which the passivation film has been removed, and so as to define a remaining portion comprised of a non-irradiated part of the conductive material, the covering portion being spaced apart from the remaining portion and in a hole formed through the electrically conductive material; and
filling the hole with a new conductive material, so as to electrically connect the stainless steel component and the piezoelectric element, the new conductive material being electrically conductive and also in the form of the electrically conductive material previously applied.

\* \* \* \* \*